United States Patent [19]

Muramatsu et al.

[11] Patent Number: 5,187,697
[45] Date of Patent: Feb. 16, 1993

[54] METHOD OF READING RECORDED INFORMATION FROM INFORMATION STORAGE MEDIUM WITH TRACKS

[75] Inventors: Eiji Muramatsu; Takanori Maeda, both of Tokorozawa, Japan

[73] Assignee: Pioneer Electronic Corporation, Tokyo, Japan

[21] Appl. No.: 536,867

[22] Filed: Jun. 12, 1990

[30] Foreign Application Priority Data

Jun. 12, 1989 [JP] Japan .................................. 1-148590

[51] Int. Cl.$^5$ ...................... G11B 7/007; G11B 21/12
[52] U.S. Cl. .................................... 369/44.32; 369/47
[58] Field of Search ..................... 369/44.32, 44.38, 32, 369/47, 48

[56] References Cited

U.S. PATENT DOCUMENTS

| | | | |
|---|---|---|---|
| 4,094,010 | 6/1978 | Pepperl et al. | 369/44.38 |
| 4,443,870 | 4/1984 | Hazel et al. | 369/44.38 |
| 4,497,050 | 1/1985 | Beetstra | 369/48 |
| 4,498,110 | 2/1985 | Kimura | 369/44.32 |
| 4,536,864 | 8/1985 | Van Rosmalen | 369/44.32 |
| 4,611,314 | 9/1986 | Ogata et al. | 369/48 |
| 4,623,993 | 11/1986 | Schlösser | 369/44.32 |
| 4,701,897 | 10/1987 | Nakagawa | 369/44.32 |
| 4,796,247 | 1/1989 | Vogelsang | 369/44.32 |
| 4,860,272 | 8/1989 | Nishikawa et al. | 369/48 |
| 5,033,041 | 7/1991 | Schröder | 369/44.32 |

Primary Examiner—Roy N. Envall, Jr.
Assistant Examiner—Jennifer L. Hazard
Attorney, Agent, or Firm—Sughrue, Mion, Zinn, Macpeak & Seas

[57] ABSTRACT

The same track on an optical disk is read at least twice by an optical pickup at a speed which is at least twice a standard speed to store the read information into a memory at a time of the first reading corresponding to a memory periodic interval. When an erroneous track jump has occurred, the optical pickup is returned to the track on which the erroneous track jump has occurred and the read information from the track is stored into the memory during an empty interval.

6 Claims, 6 Drawing Sheets

FIG. 1
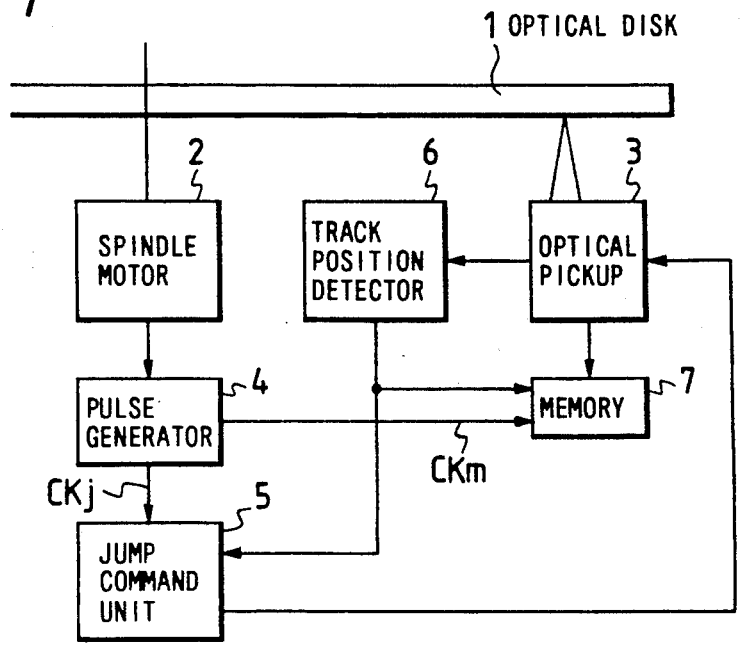
FIG. 2
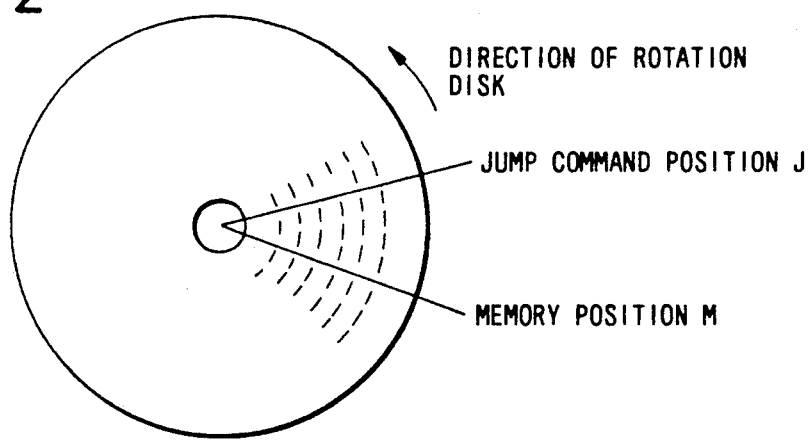
FIG. 4
| SPOT POSITION | JUMP POSITION | ① | MEMORY POSITION | ② | JUMP POSITION | ③ | MEMORY POSITION | ④ | JUMP POSITION |
|---|---|---|---|---|---|---|---|---|---|
| OPERATION | JUMP ONE TRACK TO INNER TRACK | | START OF STORAGE | | | | END OF STORAGE | | JUMP |

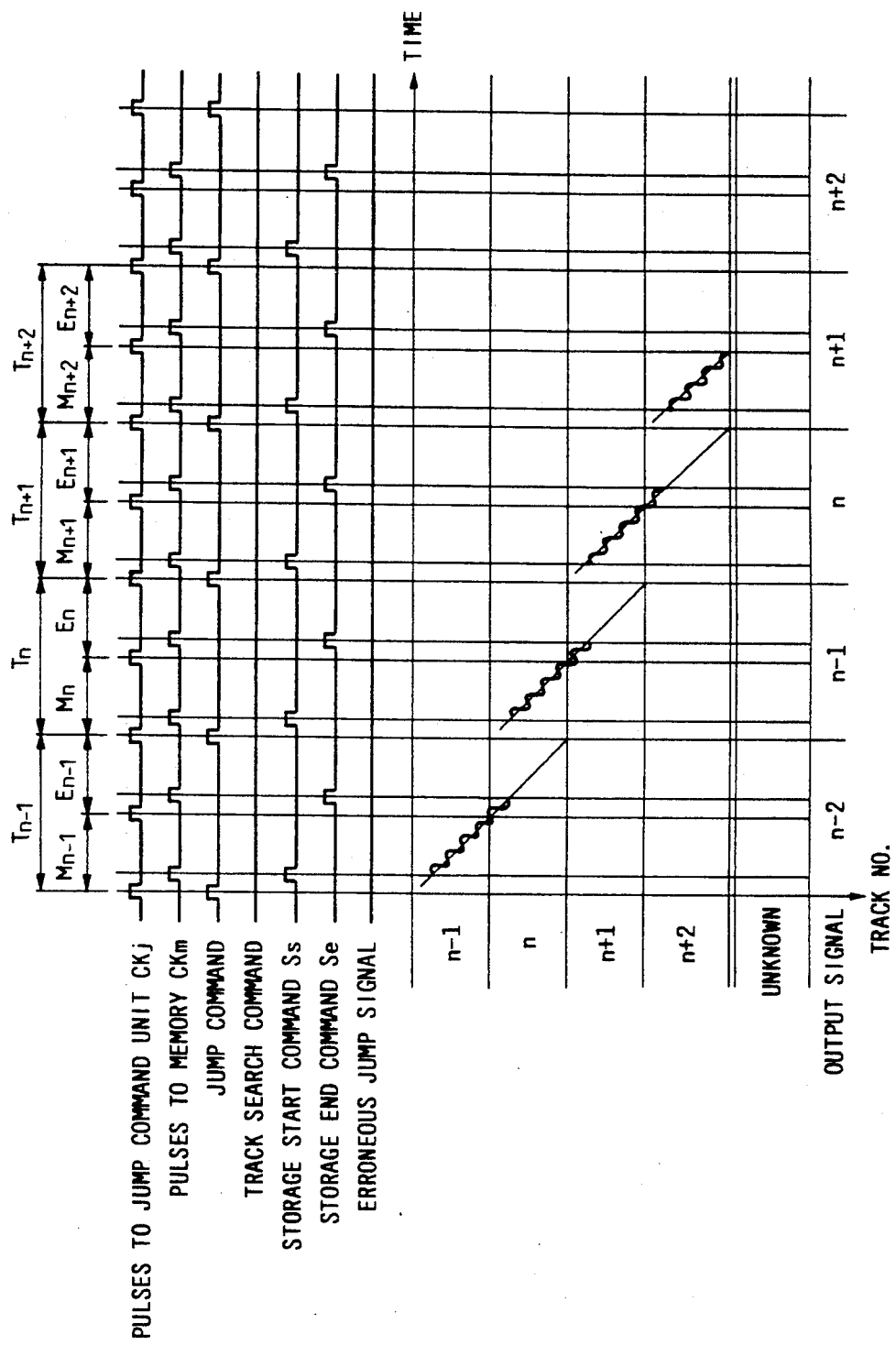

METHOD OF READING RECORDED INFORMATION FROM INFORMATION STORAGE MEDIUM WITH TRACKS

BACKGROUND OF THE INVENTION

The present invention relates to a method of reading recorded information from an information storage medium such as a compact disk (CD), a laser vision disk (LVD), or the like in which desired information is recorded in spiral tracks.

Generally, information is recorded in an optical disk at a predetermined velocity (constant linear velocity or constant angular velocity). The recorded information is typically in the form of pits successively arranged in the spiral tracks on a time-series basis. The recorded information is read from the optical disk by an optical pickup, which generates a reproduced signal in a real-time manner.

In order to accurately read the recorded information, the tracks must be scanned or traced accurately. It has been customary to employ a tracking servo control system such as a three-beam method, a push-pull method, or the like for correcting tracking errors.

Therefore, the conventional read-out devices employ tracking servo control for proper tracking. However, when a read-out device is subjected to a strong external shock, the beam spot applied from the optical pickup to the optical disk may move out of the tracking servo control range. This is a phenomenon known as a track jump. In the event of a track jump, the beam spot is shifted to a track other than the track which is to be traced by the beam spot, with the result that some recorded information is skipped in the reproduced sound. The track jump is caused in CD and LVD players.

The track jump occurs due to external forces applied to optical disk players, and should be distinguished from an intentional or forced track jump in trick play and search modes.

SUMMARY OF THE INVENTION

It is an object of the present invention to provide a method of reading recorded information from an information storage medium without interruptions such as skipping of some recorded information even when a track jump is caused by a shock or the like.

According to the present invention, there is provided a method of reading recorded information from an information storage medium in which the information is recorded in spiral tracks on a time-series basis at a standard speed, the method comprising the steps of: reading each of the tracks at least twice at respective reading periodic intervals at a speed which is at least twice the standard speed, and storing the read information into a memory at a former one of the reading periodic intervals, repeatedly at periodic intervals of the standard speed; reading again any track, from which an erroneous track jump has occurred, at a reading periodic interval next to the reading periodic interval in which the erroneous track jump has occurred, and storing the read information into the memory; and reading the stored information from the memory continuously on a time-series basis at the standard speed to output information signals to a reproduction device.

The information, which is recorded in the information storage medium at the standard speed, is read at the speed which is at least twice the standard speed. The read information is stored into the memory at periodic intervals which are half or less than half the periodic intervals of the standard speed. The above operation is repeated at the periodic intervals of the standard speed. As a result, each of the periodic intervals is composed of one reading periodic intervals and another reading periodic interval referred to as an empty periodic interval. If an erroneous track jump occurs, information is read in the empty periodic interval of the periodic interval in which the track jump has occurred, or if an erroneous track jump occurs in an empty periodic interval, information is read again in the next reading periodic interval, and the read information is stored successively into the memory on a time-series basis. The stored information is then read out of the memory at the standard speed, so that the recorded information can be reproduced substantially on a real-time basis. Since the recorded information is read again, it can be reproduced without interruptions such as skipping of recorded material.

The above and other objects, features and advantages of the present invention will become more apparent from the following description when taken in conjuction with the accompanying drawings in which a preferred embodiment of the present invention is shown by way of illustrative example.

BRIEF DESCRIPTION OF THE DRAWINGS

FIG. 1 is a block diagram of a read-out device for carrying out an information reading method according to the present invention;

FIG. 2 is a plan view illustrative of a jump command position and a memory position on an optical disk;

FIG. 3 is a timing chart of signals produced during normal operation;

FIG. 4 is a diagram showing normal operation; and

DETAILED DESCRIPTION OF THE INVENTION

Figure 5:
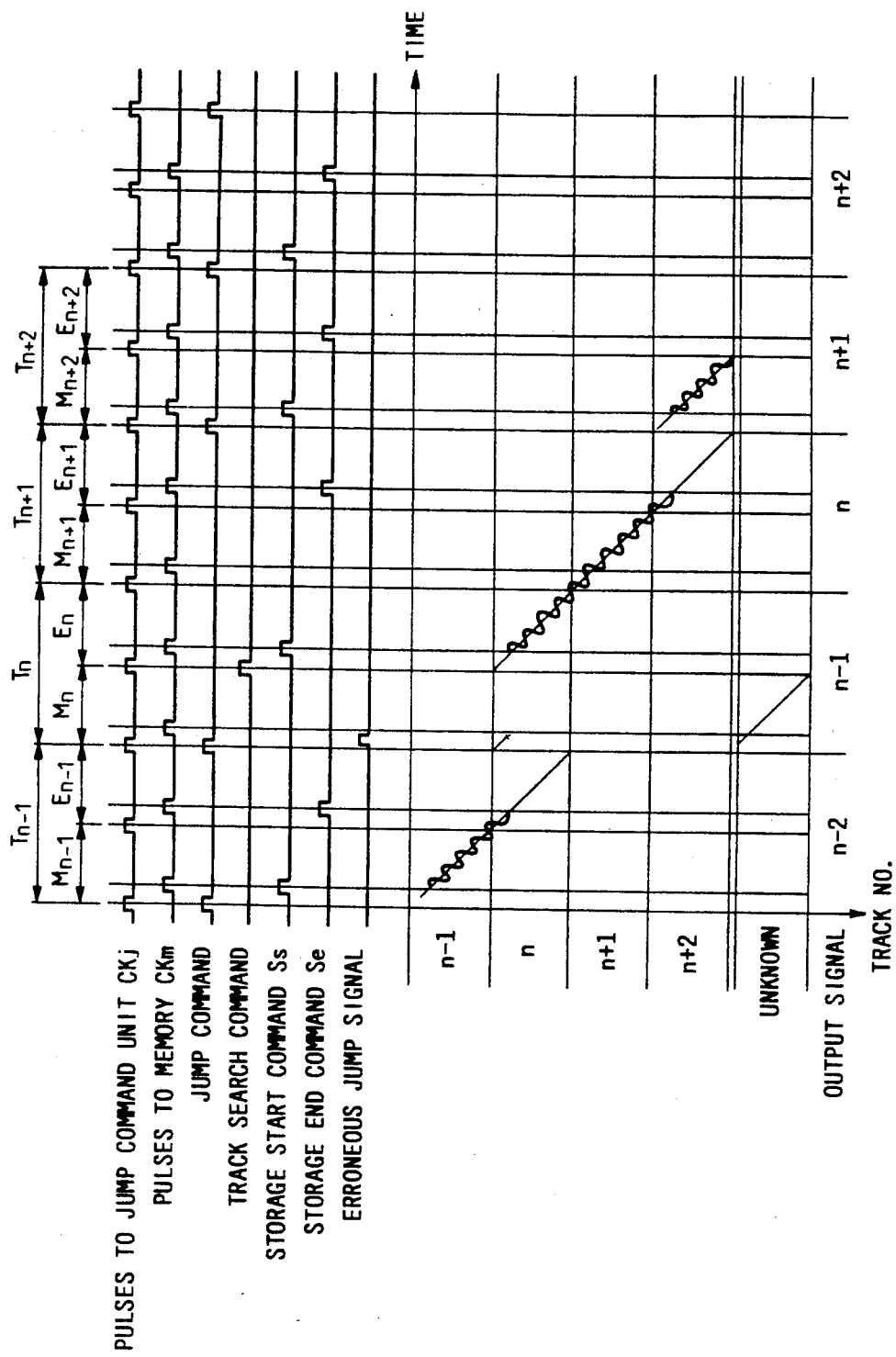
FIGS. 5 through 8 are timing charts of signals produced when erroneous track jumps occur.

FIG. 1 shows in block form a read-out device for carrying out an information reading method according to the present invention.

As shown in FIG. 1, an optical disk 1 such as a compact disk, a laser vision disk, or the like is rotated by a spindle motor 2 so that it is scanned at either a constant linear velocity (CLV) or a constant angular velocity (CAV). The velocity at which the optical disk 1 is scanned may be twice or more than twice a normal or standard speed (which ranges from 1.2 m/s to 1.4 m/s for CDs). Desired information is recorded in the optical disk at such a standard speed. In this embodiment, the velocity is twice the standard speed. When the spindle motor 2 is energized, a pulse generator 4 generates pulses which are sent to a jump command unit 5 and a memory 7. The pulses are generated by the pulse generator 4 at periodic intervals which are the same as the periodic intervals with which the optical disk 1 rotates at the aforesaid velocity. Therefore, the periodic intervals of the generated pulses are half the periodic intervals of the standard speed. When a pulse is applied from the pulse generator 4 to the jump command unit 5, the jump command unit 5 sends a jump command to an optical pickup 3. In response to the jump command, the optical pickup 3 makes a forced track jump. When pulses are sent to the memory 7, the memory 7 repeatedly starts and stops storing information read by the optical pickup 3 at the periodic interval of the applied pulses. A track position detector 6 detects a track position based on the output signal from the optical pickup 3. The track position detector 6 serves to detect an erroneous track jump due to shocks or the like and also to search for a track to which the optical pickup 3 should return. The erroneous track jump is detected by counting the number of the increase of track error signals. The direction of the erroneous track jump is judged by the direction (+ or −) of the increase of the track error signals. This means is disclosed in U.S. application Ser. No. 492,165 filed by the same Applicant on Mar. 13, 1990 and a book (pages 70 to 75) "Principles of Optical Disc Systems" written by G. Bouwhuis, J. Braat, A. Huijser, J. Pasman, G. van Rosmalen and K. Schouhamer Immink of Philips Research Laboratories, Eindhoven. Further, most optical disks have address signals on their recording surfaces. In such a case, the optical pickup 3 can always detect the address of a track.

Operation of the read-out device will be described below.

As shown in FIG. 2, the optical disk 3 has a jump command position J on a radial straight line and a memory position M which is angularly spaced from the jump command position J. The jump command position J and the memory position M are preset on the optical disk 3.

In a normal read-out mode, the optical disk 3 is scanned successively from an (n−2)th track to an (n+2)th track (i.e., from an inner circumferential track toward an outer circumferential track), as shown in FIG. 3. At this time, the optical disk 3 rotates at a speed which is twice the standard speed. If it is assumed that the standard speed has periodic intervals $Tn-1$, $Tn-1$, $Tn$, $Tn+1$, $Tn+2$ at these tracks, then pulses produced by the pulse generator 4 at periodic intervals that are half the periodic intervals of the standard speed, are periodically delivered as pulses CKj to the jump command unit 5 and as pulses CKm to the memory 7. The pulses CKm slightly lag in phase behind the pulse CKj, as described later. The periodic intervals $Tn-2$, $Tn-1$, $Tn$. $Tn+1$, $Tn+2$ are respectively composed of memory periodic intervals $Mn-2$, $Mn-1$, $Mn$, $Mn+1$, $Mn+2$ and empty periodic intervals $En-2$, $En-1$, $En$, $En+1$, $En+2$. In FIG. 3, diagonal lines represent scanning of the tracks by the light beam spot, and wavy lines indicate storage of the read signals.

The pulses CKj are generated synchronously with the arrival of a light beam spot at the jump command position J, and sent to the jump command unit 5. Each time the light beam spot passes twice through the jump command position J, that is, each time the disk 1 is rotated twice, the jump command unit 5 sends a jump command to the optical pickup 3 to return the light beam spot to the preceding track. Therefore, the optical pickup 3 scans the same track twice. The memory position M is angularly spaced from the jump command position J by such an angular distance which assures a period of time long enough for the light beam spot to scan the track normally after the forced track jump. When the light beam spot reaches the memory position M after the forced track jump, the pulse generator 4 sends a pulse CKm to the memory 7. The phase difference between the pulses CKj and CKm corresponds to the distance between the jump command position J and the memory position M. When the pulse CKm is supplied, the memory 7 starts storing information read by the optical pickup 3 in response to a storage start command Ss which is generated at twice periodic intervals of the pulse CKm, and stops storing the read information in response to a next storage end command Se which is generated at a delayed timing corresponding to the periodic interval of the pulse CKj. The time interval between the storage start command Ss and the storage end command Se corresponds to each of the memory periodic intervals $Mn-2$ through $Mn+2$ and the empty periodic intervals $En-2$ through $En+2$. Therefore, the read information is stored in the memory periodic intervals $Mn-2$ through $Mn+2$ of the periodic intervals $Tn-2$ through $Tn+2$, with the empty periodic intervals $En-2$ through $En+2$ intervening therebetween. The stored information is then read at periodic intervals which are the same as the periodic intervals $Tn-2$ through $Tn+2$ but lag one periodic interval in phase to be outputted to a reproduction device. The information is continuously produced as continuous signals on a time-series basis successively from the (n−2)th, (n−1)th, nth, (n+1)th, (n+2)th tracks. The above sequence is shown in FIG. 4.

An erroneous track jump of the light beam spot will be described below.

When the light beam spot makes an erroneous track jump while it is scanning the nth track, such an erroneous track jump is detected by the track position detector 6. An erroneous track jump is detected, for example, from the number of instances in which a tracking error signal is higher in level than a predetermined value. The detected signal from the track position detector 6 is applied to the jump command unit 5 and the memory 7.

After the light beam spot has made the erroneous track jump, it starts scanning a track other than the track which should be scanned. When the light beam spot first arrives at the jump command position J after an erroneous track jump has occurred, the jump command unit 5 issues a track search command to return the optical pickup 3 to the track which is to be scanned by the light beam spot, in response to the output signal from the track position detector 6. The light beam spot is now shifted back to the proper track.

An erroneous track jump may occur in any of various regions indicated at ①through ④ in FIG. 4. Memory operation and forced jump operation are modified to cope with different erroneous track jumps in these regions. It is possible to return the light beam spot for normal tracking operation while the optical disk 1 is making three revolutions at most after any erroneous track jump has taken place. This will be explained in more detail.

FIGS. 5 through 8 show, by way of example, signals produced when erroneous track jumps occur in the respective regions ① through ④ in FIG. 4.

In FIG. 5, an erroneous track jump occurs in the memory periodic interval Mn of the periodic interval Tn during an initial period of the scanning of the nth track, an erroneous track jump signal is generated by the track position detector 6 which then searches for a track to which the optical pickup 3 should return in response to a track search command generated synchronously with the generation of the next pulse CKj thereby to return the pickup 3 to the nth track. Then, the nth track is read again and the read signal is stored in the empty periodic interval En of the same periodic interval Tn. The memory periodic interval Mn+1 follows subsequently to the interval En.

Figure 6:
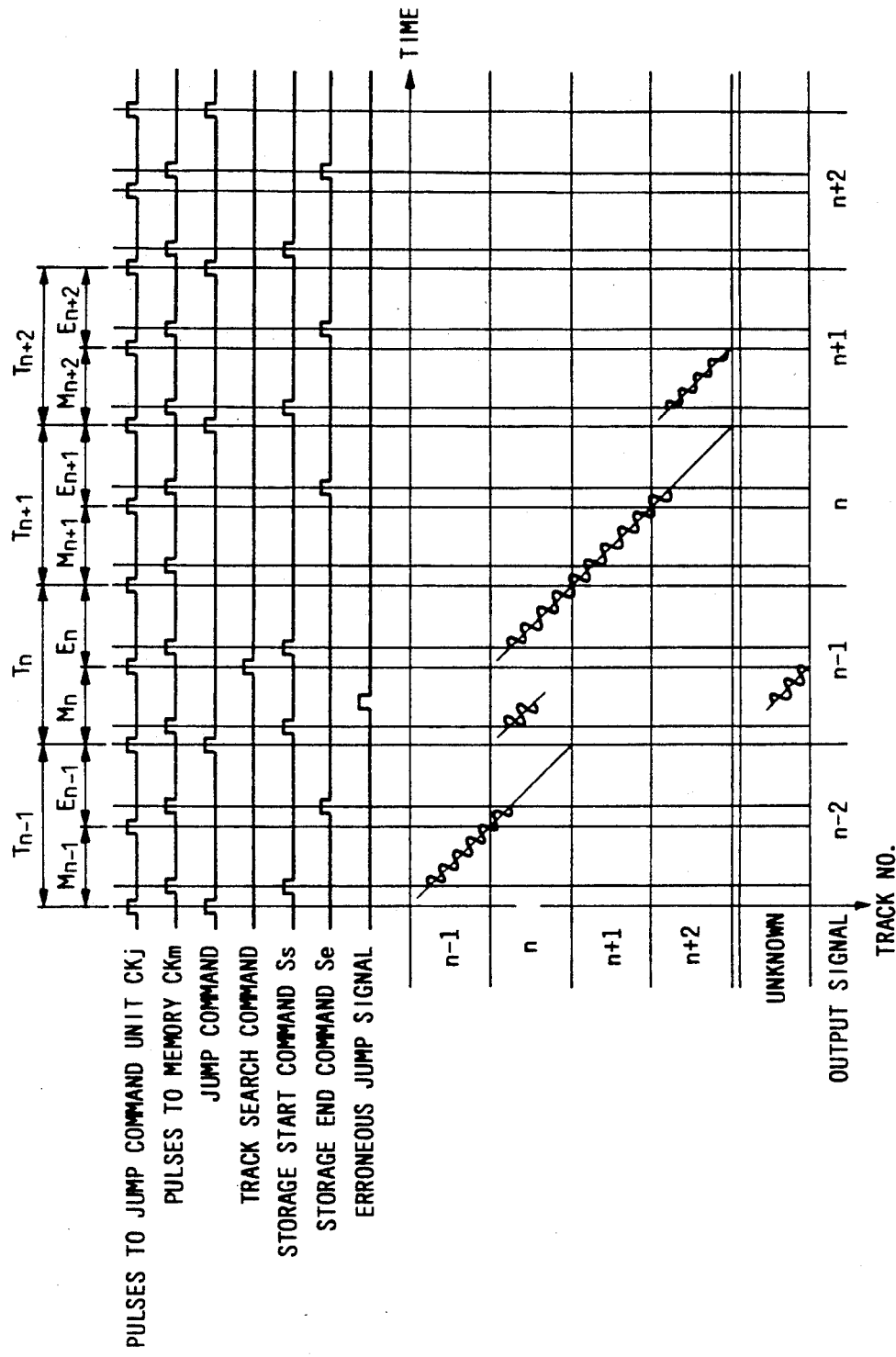

In FIG. 6, an erroneous track jump occurs in the memory periodic interval Mn of the periodic interval Tn during the scanning of the nth track to generate an erroneous track jump signal, and the nth track is read again and the read signal is stored in the empty periodic interval En of the same periodic interval Tn in a manner similar to that of FIG. 5.

Figure 7:
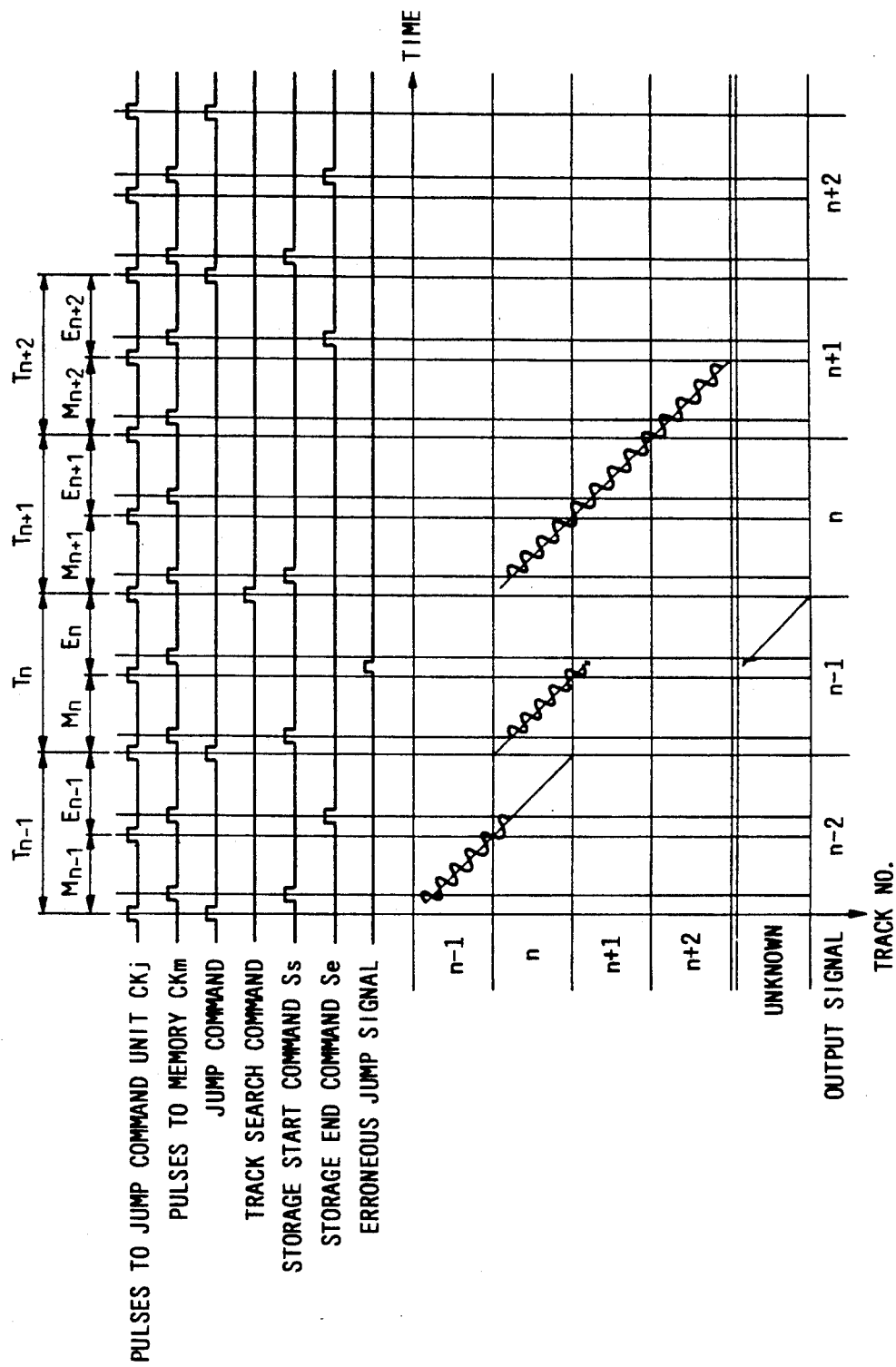

In FIG. 7, an erroneous track jump occurs in an initial period of the empty periodic interval En of the periodic interval Tn during the scanning of the nth track. At this time, the pickup 3 is returned to the nth track in response to the track search command. The nth track is then read again and the read signal is stored in the memory periodic interval Mn+1 of the next periodic interval Tn+1. In the memory periodic interval Mn+1, the (n+1)th track should be read and the read signal should be stored. Since an interrupt process of scanning the nth track again is required in the memory periodic period Mn+1, the (n+1)th track is read and the read signal is stored in the next empty periodic interval En+1. Therefore, the nth and (n+1)th tracks are read and the read signals are stored in the periodic interval Tn+1.

Figure 8:
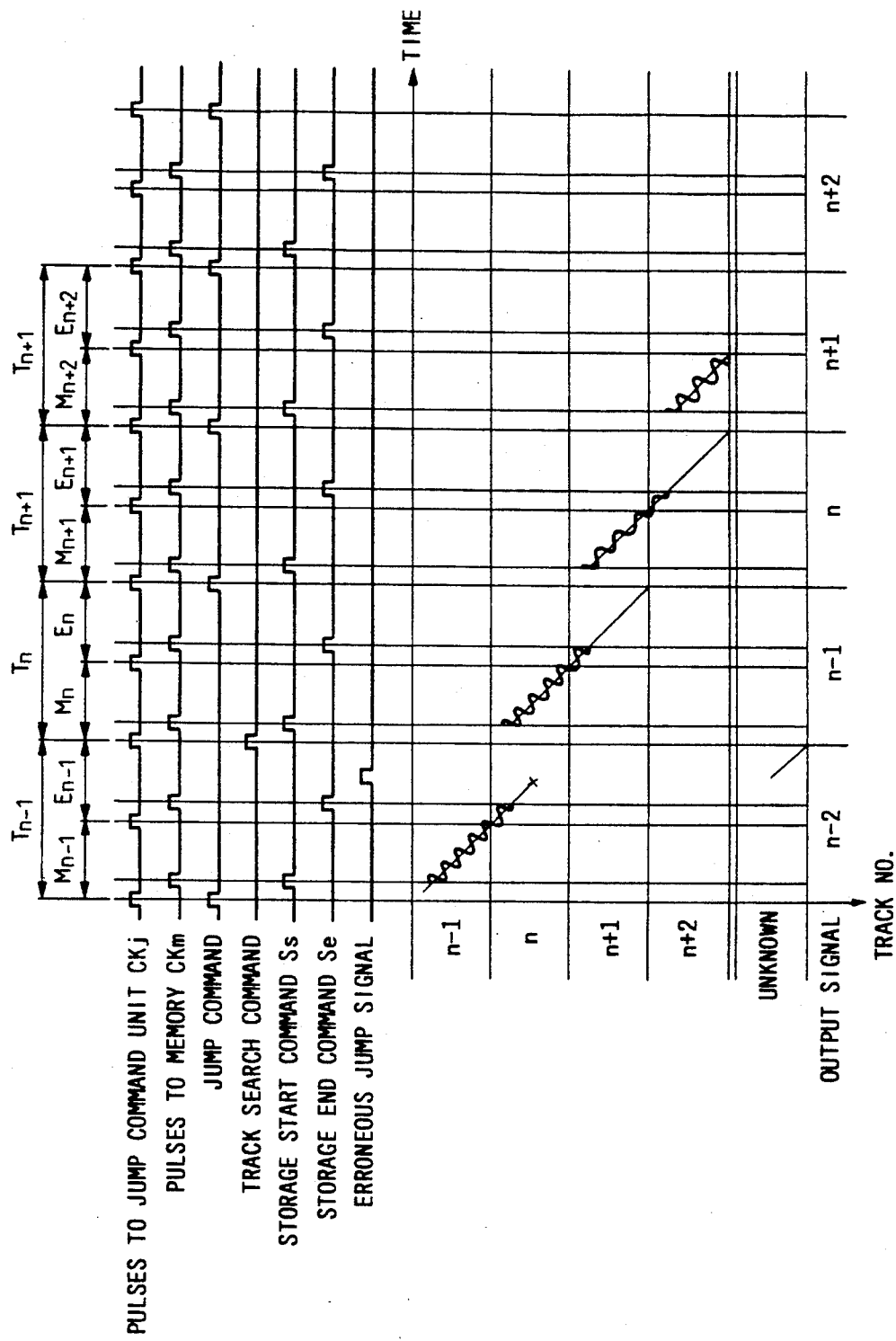

In FIG. 8, an erroneous track jump occurs in the empty periodic interval En−1 of the periodic interval Tn−1 during the scanning of the (n−1)th track. In this case, the (n−1)th track is scanned completely, the pickup 3 is returned to the nth track in response to the track search command and the nth track is read and the read signal is stored in the memory periodic interval Mn of the next periodic interval Tn.

Therefore, even if an erroneous track jump occurs, the track to be scanned is read again immediately after the erroneous track jump, and the read information is stored in the memory 7. The stored information is continuously read from the memory 7 on a time-series basis successively from the periodic intervals Tn−1, Tn, Tn+1, - - -. Therefore, the output signal from the readout device does not suffer undesired interruptions.

While the present invention has been described with respect to a CD player, the principles of the present invention are also applicable to any information storage mediums insofar as they store information in tracks on a time-series basis. In the illustrated embodiment, the optical disk rotates at a speed which is twice the ordinary speed. However, the optical disk may rotate at a speed which is more than twice the ordinary speed. If the capacity of the memory used is increased, the read-out of stored signals may be delayed with respect to the read-in of signals, so that the time required to effect the track search may be increased. The track search is not limited to the process described above, but may be effected through comparison of addresses on a CD, or the like.

With the present invention, as described above, even if a track jump is caused by an external shock or the like, stored information can be read and reproduced without interruptions such as skipping of the recorded material.

The invention may be embodied in other specific forms without departing from the spirit of essential characteristics thereof. The present embodiment is therefore to be considered in all aspects as illustrative and not restrictive, the scope of the invention being indicated by the appended claims rather than by the foregoing description and all changes which come within the meaning and range of equivalency of the claims are therefore intended to be embraced therein.

What is claimed is:

1. A method of reading information recorded on an information storage medium in spiral tracks on a time-series basis at a standard speed, said method comprising the steps of:
   reading each of said tracks at least twice at respective reading periodic intervals while the information storage medium is being rotated at a speed which is at least twice said standard speed, and storing said reading information at periodic intervals of said speed which is at least twice the standard speed into a memory;
   detecting any erroneous track jump from a first track from which information is currently being read and returning to said first track;
   reading again said first track at a reading periodic interval next to the reading periodic interval in which the erroneous track jump has occurred, and storing the read information into said memory; and
   reading said stored information from said memory continuously on a time-series basis at said standard speed to output information signals to a reproduction device.

2. A method according to claim 1, wherein said information storage medium has a jump command position for generating a jump command to jump an information reading circuit to a next track and a memory position which initiates the step of storing read information in to said memory, said memory position being angularly spaced from said jump command position.

3. A method according to claim 1, wherein when each of the tracks is read at least twice, said method further comprises the steps of generating a pulse in synchronism with an application of a light beam spot for reading the recorded information from said tracks at a jump command position on said information storage medium which generates a jump command to jump the light beam spot, and sending said generated pulse to a jump command unit to return the light beam spot to a preceding track after having passed through the jump command position twice.

4. A method according to claim 1, wherein when the erroneous track jump occurs from one of said spiral tracks to be scanned by light beam spot to another track, said method further comprises the step of issuing a track search command to return said information reading circuit to said track to be scanned in response to a first arrival of the light beam spot which is scanning said another track at a jump command position on said information storage medium.

5. A method according to claim 1, wherein each of said reading periodic intervals is composed of a memory periodic interval and an empty periodic interval.

6. A method of reading information recorded on an information storage medium in spiral tracks on a time-series basis at a standard speed, said method comprising the steps of:
   (a) reading each of said tracks at least twice at respective reading periodic intervals while the information storage medium is being rotated at a speed which is at least twice said standard speed, each of said reading periodic interval comprising a first sub-periodic interval and at least a second sup-periodic interval,
   said reading step comprising the steps of:
      (i) reading one of said tracks and storing reading information of said track into a memory at the first sub-periodic interval, and
      (ii) reading again said track at the second sub-periodic interval next to said first sub-periodic interval, (b) detecting any erroneous track jumps from a first track from which information is currently being read and returning to said first track;

(c) reading again said first track at a sub-periodic interval next to the sub-periodic interval in which the erroneous track jump has occurred, and storing the reading information into said memory; and (d) reading said stored information from said memory continuously on the time-series basis at said standard speed to output information signals to a reproduction device.

* * * * *